United States Patent [19]
Imai et al.

[11] Patent Number: 5,987,476
[45] Date of Patent: *Nov. 16, 1999

[54] FILE READING METHOD AND FILE REQUESTING CLIENT DEVICE IN CLIENT-SERVER INFORMATION COMMUNICATION SYSTEM

[75] Inventors: Toru Imai; Toshihiko Shimokawa; Hideki Yoshida, all of Kanagawa; Hiroku Fujii, Tokyo, all of Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/791,268

[22] Filed: Jan. 30, 1997

[30] Foreign Application Priority Data

Jan. 31, 1996 [JP] Japan ................... P08-015355

[51] Int. Cl.⁶ .................................... G06F 17/30
[52] U.S. Cl. ......................... 707/201; 707/202; 707/10; 395/200.31; 395/200.33; 711/126
[58] Field of Search .................. 707/201, 202, 707/10; 395/200.31, 200.33, 182.14; 711/126

[56] References Cited

U.S. PATENT DOCUMENTS

| | | | |
|---|---|---|---|
| 4,887,204 | 12/1989 | Johnson et al. | 707/10 |
| 4,897,781 | 1/1990 | Chang et al. | 707/201 |
| 5,559,984 | 9/1996 | Nakano et al. | 711/121 |
| 5,682,514 | 10/1997 | Yohe et al. | 711/118 |
| 5,727,129 | 3/1998 | Barrett et al. | 706/10 |
| 5,742,820 | 4/1998 | Perlman et al. | 1/1 |
| 5,802,304 | 9/1998 | Stone | 395/200.57 |
| 5,864,837 | 1/1999 | Maimone | 707/1 |
| 5,873,100 | 2/1999 | Adams et al. | 707/204 |

OTHER PUBLICATIONS

Kumar et al., "A SHARED Web to Support Design Teams", Proceedings. Third Workshop on Enabling Technologies: Infrastructure for Collaborative Enterprises, Apr. 17–19, 1994, Morgantown, West Virginia, pp. 178–182.

Libes, " Concepts of the NIST EXPRESS Server", Proceedings. First International Workshop on Services in Distribuited and Networked Environments, 27–28 June Prague, Czech Republic, pp. 26–31, Jun. 1994.

Ratushk, "Born to Browse: Microsoft Plus Enhances and Simplifies Browsing on the Internet With Windows 95", Computer Shopper, vol. 15, No. 10, Oct. 1995, pp.566–568.

Gralla, "The Underground Internet", PC/Computing, vol. 8, No. 11, Nov. 1995, pp. 195–201.

*Primary Examiner*—Paul R. Lintz
*Attorney, Agent, or Firm*—Oblon, Spivak, McClelland, Maier & Neustadt, P.C.

[57] ABSTRACT

A file reading scheme in a client-server information communication system, capable of efficiently utilizing files cached into a local file storage region of the client regardless of an environment under which the client is operated. Whether the client is in a state in which an access to the server according to a specified protocol is possible or not is judged when each file transfer request is issued at the client. Then, an access to the server according to the specified protocol is made when it is judged that the client is in a state in which an access to the server according to the specified protocol is possible. On the other hand, a requested file specified by each file transfer request is read from files cached in the local file storage region when it is judged that the client is in a state in which an access to the server according to the specified protocol is not possible.

22 Claims, 7 Drawing Sheets

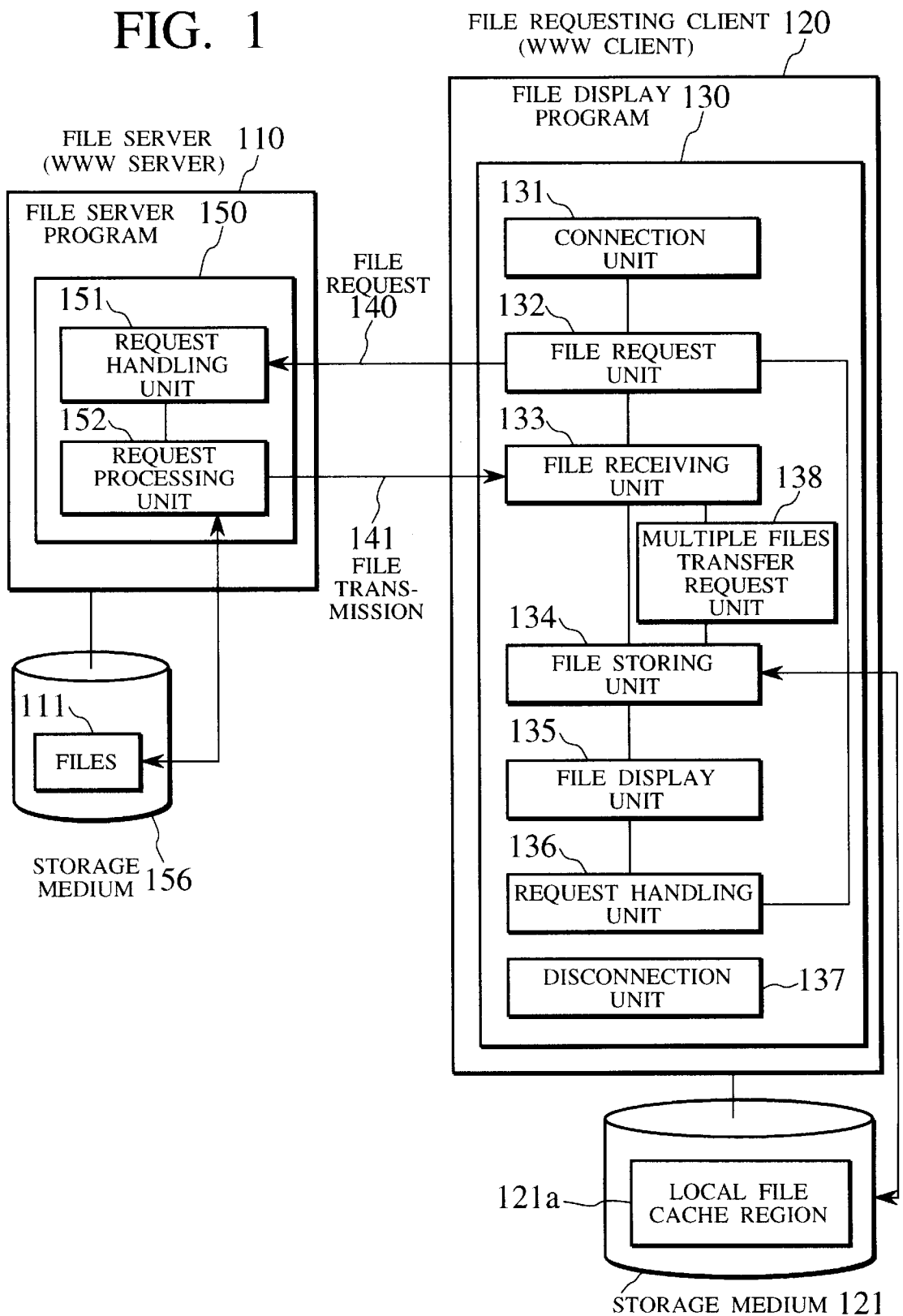

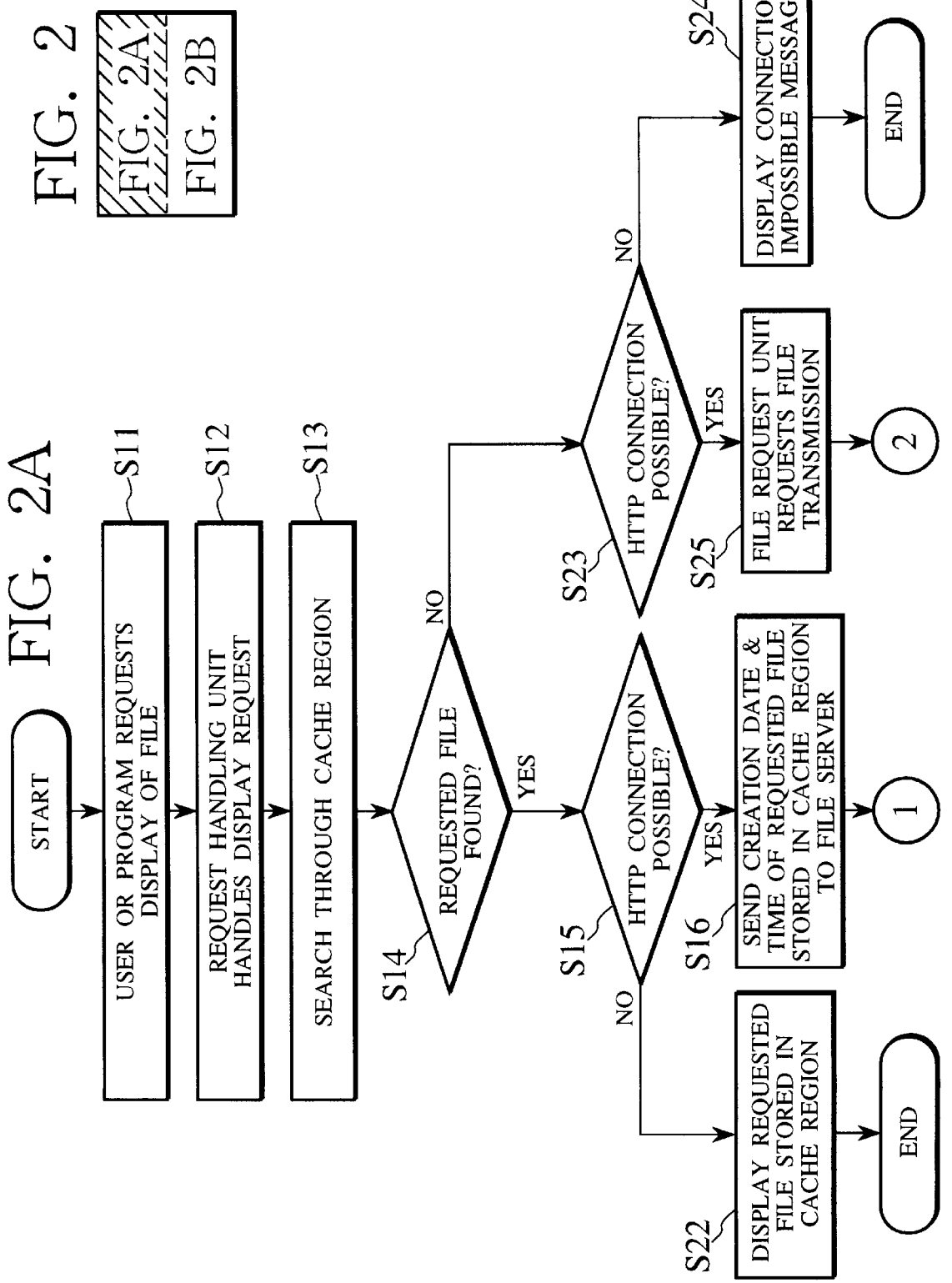

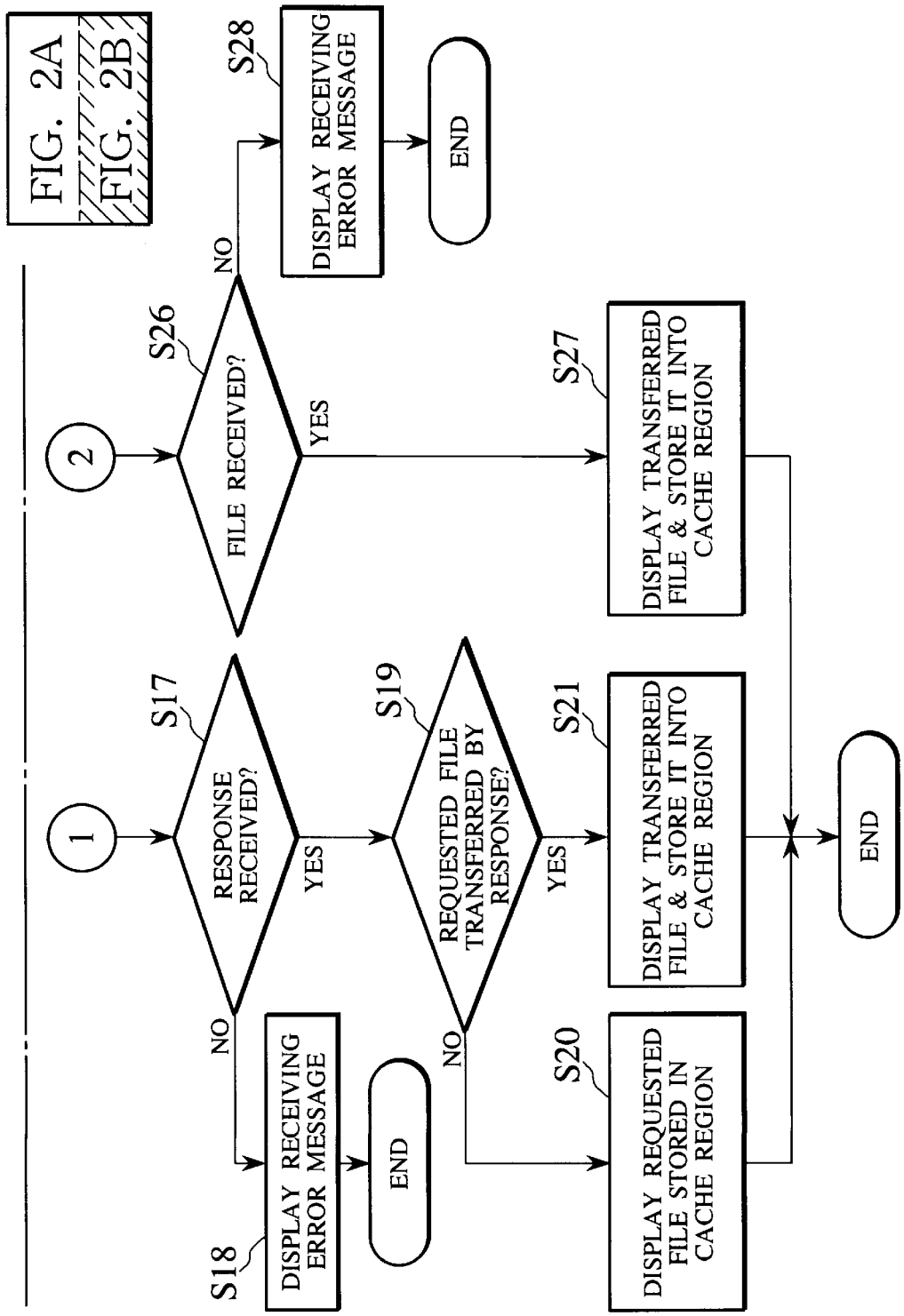

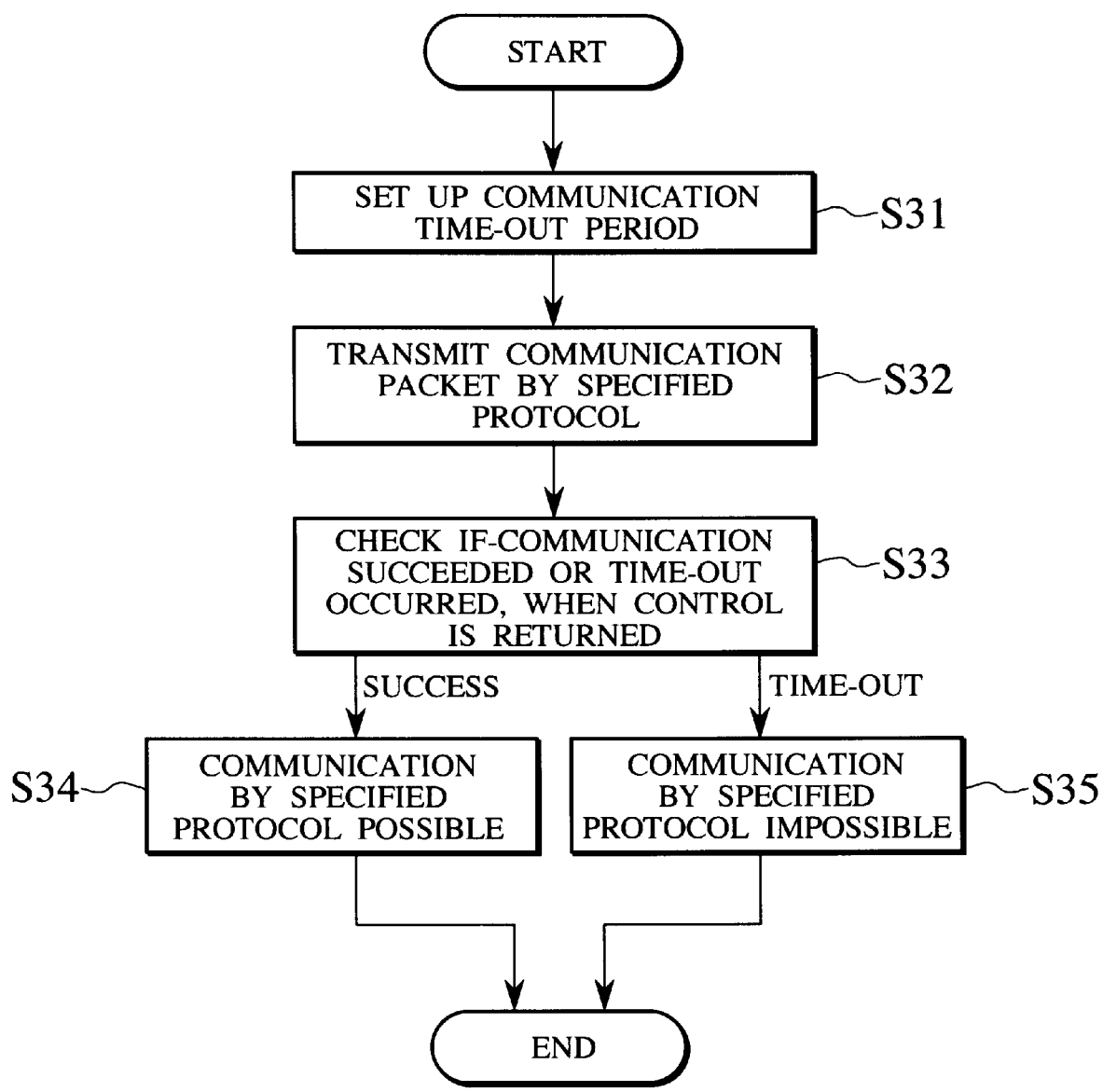

FILE READING METHOD AND FILE REQUESTING CLIENT DEVICE IN CLIENT-SERVER INFORMATION COMMUNICATION SYSTEM

BACKGROUND OF THE INVENTION

1. Field of the Invention

The present invention relates to a file reading method and a file requesting client device to be used in a client-server information communication system formed by a file server which realizes a file providing service and a file requesting client which issues a file transfer request to the file server and cache the file transferred from the file server in response to that file transfer request into its own cache region.

2. Description of the Background Art

The WWW (World Wide Web) is a known file providing program which provides files such as documents from a server to a client through the Internet. The WWW comprises a WWW server and a WWW client, and provides files such as documents from the WWW server to the WWW client according to the prescribed file transfer protocol called HTTP (HyperText Transfer Protocol).

In general, a file transfer through a network is associated with problems such as a considerable amount of transfer time required and an increase of traffic in the network, so that it is preferable to avoid unnecessary file transfer as much as possible.

For this reason, there is a type of WWW client which has a function for transmitting a file transfer request according to HTTP to the WWW server, and temporarily storing a file transferred from the WWW server in response to that file transfer request into a local file storage region within its own storage medium called cache. Then, when another file transfer request for the same file occurs, the WWW client notifies the creation date and time of the cached file to the WWW server. At the WWW server, the notified creation date and time are compared with the creation date and time of the requested file, and if the creation date and time coincide, this fact is notified from the WWW server to the WWW client. In response, the WWW client reads out the corresponding file from its own storage medium. In this manner, the file is transferred from the WWW server to the WWW client only when the creation date and time do not coincide, i.e., the requested file has been updated since it was originally transferred from the WWW server to the WWW client, so that it is possible to reduce traffic in the network.

However, under the circumstance in which the WWW client cannot make a normal access to the WWW server as in a case where the client side computer is not connected to the network, the files stored in the cache cannot be utilized even when the stored files include a file requested by the file transfer request according to HTTP.

This is because the conventional WWW client has such a configuration that, when the file transfer request in the HTTP format is received, even if the requested file is stored in the cache of this conventional WWW client, it is necessary for this conventional WWW client to communicate with the WWW server in order to ascertain whether the cached file is the latest one or not, and when an access for this purpose is not carried out normally, a communication error message is presented to a user. Consequently, in the conventional WWW client, the cached file cannot be utilized unless the access to the WWW server is carried out normally.

On the other hand, the present inventors recently proposed a new file transfer method in which a file requested by a user as well as its related files are transferred from the server to the client together in response to a single file transfer request (see Japanese Patent Application No. 7-292910 (1995) for detail). According to this new file transfer method, a transfer of multiple files from the server to the client can be realized by a single command from a user, without requiring a user to specify files to be transferred one by one. Using this new file transfer method, it is possible to realize an efficient file caching scheme in which those files (related files) which are likely to be requested by a user later on are cached in advance in the client computer. This scheme is particularly effective in a case where the client computer is a device such as a portable terminal which is not necessarily used under an environment in which a connection to a network is always possible.

With this new file transfer method, however, the similar problem as described above also arises at a time of utilizing the cached files. Namely, any of the cached files cannot be utilized unless the access to the WWW server is carried out normally.

It is to be noted here that, in a case of Netscape Navigator (registered trademark), a user has an option to require the checking as to whether the cached file is the latest one or not. When this checking is required, if no response is received from the server for some reasons such as the server is not in operation or the connection to the network is disconnected, no cached file will be displayed at the client. When this checking is not required, the cached file will be displayed without requiring a network access.

SUMMARY OF THE INVENTION

It is therefore an object of the present invention to provide a file reading method and a file requesting client device in a client-server information communication system, capable of efficiently utilizing files cached into a local file storage region of the client regardless of an environment under which the client is operated.

According to one aspect of the present invention there is provided a file reading method in a client-server system including a server for realizing a file providing service and a client for issuing file transfer requests and caching files transferred from the server in response to the file transfer requests into a local file storage region, the method comprising the steps of: judging whether the client is in a state in which an access to the server according to a specified protocol is possible or not, when each file transfer request is issued at the client; making an access to the server according to the specified protocol when the judging step judges that the client is in a state in which an access to the server according to the specified protocol is possible; and reading a requested file specified by said each file transfer request from files cached in the local file storage region when the judging step judges that the client is in a state in which an access to the server according to the specified protocol is not possible.

According to another aspect of the present invention there is provided a file reading method in a client-server system including a server for realizing a file providing service and a client for issuing file transfer requests and caching files transferred from the server in response to the file transfer requests into a local file storage region, the method comprising the steps of: judging whether the client is in a state in which an access to the server according to a specified protocol is possible or not, when each file transfer request is issued at the client; checking whether a requested file specified by said each file transfer request among files cached in the local file storage region is a latest file or not, when the judging step judges that the client is in a state in which an access to the server according to the specified protocol is possible; making an access to the server according to the specified protocol and transferring the requested file from the server to the client, when the checking step finds that the requested file as cached in the local file storage region is not the latest file; and reading the requested file from files cached in the local file storage region when the judging step judges that the client is in a state in which an access to the server according to the specified protocol is not possible, or when the checking step finds that the requested file as cached in the local file storage region is the latest file.

According to another aspect of the present invention there is provided a file reading method in a client-server system including a server for realizing a file providing service and a client for issuing file transfer requests and caching files transferred from the server in response to the file transfer requests into a local file storage region, the method comprising the steps of: checking whether a requested file specified by each file transfer request exists among files cached in the local file storage region, when said each file transfer request is issued at the client; reading the requested file from files cached in the local file storage region when the checking step finds that the requested file exists among files cached in the local file storage region; judging whether the client is in a state in which an access to the server according to a specified protocol is possible or not, when the checking step finds that the requested file does not exist among files cached in the local file storage region; and making an access to the server according to the specified protocol and transferring the requested file from the server to the client, when the judging step judges that the client is in a state in which an access to the server according to the specified protocol is possible.

According to another aspect of the present invention there is provided a file requesting client device functioning as a client associated with a local file storage region in a client-server system including a server for realizing a file providing service, the device comprising: first means for issuing file transfer requests; second means for caching files transferred from the server in response to the file transfer requests issued by the first means into the local file storage region; third means for judging whether the client is in a state in which an access to the server according to a specified protocol is possible or not, when each file transfer request is issued by the first means; fourth means for making an access to the server according to the specified protocol when the third means judges that the client is in a state in which an access to the server according to the specified protocol is possible; and fifth means for reading a requested file specified by said each file transfer request from files cached in the local file storage region when the third means judges that the client is in a state in which an access to the server according to the specified protocol is not possible.

According to another aspect of the present invention there is provided a file requesting client device functioning as a client associated with a local file storage region in a client-server system including a server for realizing a file providing service, the device comprising: first means for issuing file transfer requests; second means for caching files transferred from the server in response to the file transfer requests issued by the first means into the local file storage region; third means for judging whether the client is in a state in which an access to the server according to a specified protocol is possible or not, when each file transfer request is issued by the first means; fourth means for checking whether a requested file specified by said each file transfer request among files cached in the local file storage region is a latest file or not, when the third means judges that the client is in a state in which an access to the server according to the specified protocol is possible; fifth means for making an access to the server according to the specified protocol so that the server transfers the requested file to the client, when the fourth means finds that the requested file as cached in the local file storage region is not the latest file; and sixth means for reading the requested file from files cached in the local file storage region when the third means judges that the client is in a state in which an access to the server according to the specified protocol is not possible, or when the fourth means finds that the requested file as cached in the local file storage region is the latest file.

According to another aspect of the present invention there is provided a file requesting client device functioning as a client associated with a local file storage region in a client-server system including a server for realizing a file providing service, the device comprising: first means for issuing file transfer requests; second means for caching files transferred from the server in response to the file transfer requests issued by the first means into the local file storage region; third means for checking whether a requested file specified by each file transfer request exists among files cached in the local file storage region, when said each file transfer request is issued by the first means; fourth means for reading the requested file from files cached in the local file storage region when the third means finds that the requested file exists among files cached in the local file storage region; fifth means for judging whether the client is in a state in which an access to the server according to a specified protocol is possible or not, when the third means finds that the requested file does not exist among files cached in the local file storage region; and sixth means for making an access to the server according to the specified protocol so that the server transfers the requested file to the client, when the fifth means judges that the client is in a state in which an access to the server according to the specified protocol is possible.

According to another aspect of the present invention there is provided an article of manufacture, comprising: a computer usable medium having computer readable program code means embodied therein for causing a computer to function as a client associated with a local file storage region in a client-server system including a server for realizing a file providing service, the computer readable program code means including: first computer readable program code means for causing said computer to issue file transfer requests; second computer readable program code means for causing said computer to cache files transferred from the server in response to the file transfer requests issued by the first computer readable program code means into the local file storage region; third computer readable program code means for causing said computer to judge whether the client is in a state in which an access to the server according to a specified protocol is possible or not, when each file transfer request is issued by the first computer readable program code means; fourth computer readable program code means for causing said computer to make an access to the server according to the specified protocol when the third computer readable program code means judges that the client is in a state in which an access to the server according to the specified protocol is possible; and fifth computer readable program code means for causing said computer to read a requested file specified by said each file transfer request from files cached in the local file storage region when the third computer readable program code means judges that the client is in a state in which an access to the server according to the specified protocol is not possible.

According to another aspect of the present invention there is provided an article of manufacture, comprising: a computer usable medium having computer readable program code means embodied therein for causing a computer to function as a client associated with a local file storage region in a client-server system including a server for realizing a file providing service, the computer readable program code means including: first computer readable program code means for causing said computer to issue file transfer requests; second computer readable program code means for causing said computer to cache files transferred from the server in response to the file transfer requests issued by the first computer readable program code means into the local file storage region; third computer readable program code means for causing said computer to judge whether the client is in a state in which an access to the server according to a specified protocol is possible or not, when each file transfer request is issued by the first computer readable program code means; fourth computer readable program code means for causing said computer to check whether a requested file specified by said each file transfer request among files cached in the local file storage region is a latest file or not, when the third computer readable program code means judges that the client is in a state in which an access to the server according to the specified protocol is possible; fifth computer readable program code means for causing said computer to make an access to the server according to the specified protocol so that the server transfers the requested file to the client, when the fourth computer readable program code means finds that the requested file as cached in the local file storage region is not the latest file; and sixth computer readable program code means for causing said computer to read the requested file from files cached in the local file storage region when the third computer readable program code means judges that the client is in a state in which an access to the server according to the specified protocol is not possible, or when the fourth computer readable program code means finds that the requested file as cached in the local file storage region is the latest file.

According to another aspect of the present invention there is provided an article of manufacture, comprising: a computer usable medium having computer readable program code means embodied therein for causing a computer to function as a client associated with a local file storage region in a client-server system including a server for realizing a file providing service, the computer readable program code means including: first computer readable program code means for causing said computer to issue file transfer requests; second computer readable program code means for causing said computer to cache files transferred from the server in response to the file transfer requests issued by the first computer readable program code means into the local file storage region; third computer readable program code means for causing said computer to check whether a requested file specified by each file transfer request exists among files cached in the local file storage region, when said each file transfer request is issued by the first computer readable program code means; fourth computer readable program code means for causing said computer to read the requested file from files cached in the local file storage region when the third computer readable program code means finds that the requested file exists among files cached in the local file storage region; fifth computer readable program code means for causing said computer to judge whether the client is in a state in which an access to the server according to a specified protocol is possible or not, when the third computer readable program code means finds that the requested file does not exist among files cached in the local file storage region; and sixth computer readable program code means for causing said computer to make an access to the server according to the specified protocol so that the server transfers the requested file to the client, when the fifth computer readable program code means judges that the client is in a state in which an access to the server according to the specified protocol is possible.

Other features and advantages of the present invention will become apparent from the following description taken in conjunction with the accompanying drawings.

BRIEF DESCRIPTION OF THE DRAWINGS

FIG. 1 is a block diagram of an exemplary configuration of an information communication system according to one embodiment of the present invention.

FIG. 2 is a flow chart of a first concrete example of the operation procedure for the file display program in the information communication system of FIG. 1.

FIG. 3 is a flow chart of a first specific example of the procedure for the judgement processing to judge whether the server access according to the specified protocol HTTP is possible or not, that can be used in a course of the operation of FIG. 2.

DETAILED DESCRIPTION OF THE PREFERRED EMBODIMENTS

Figure 4:
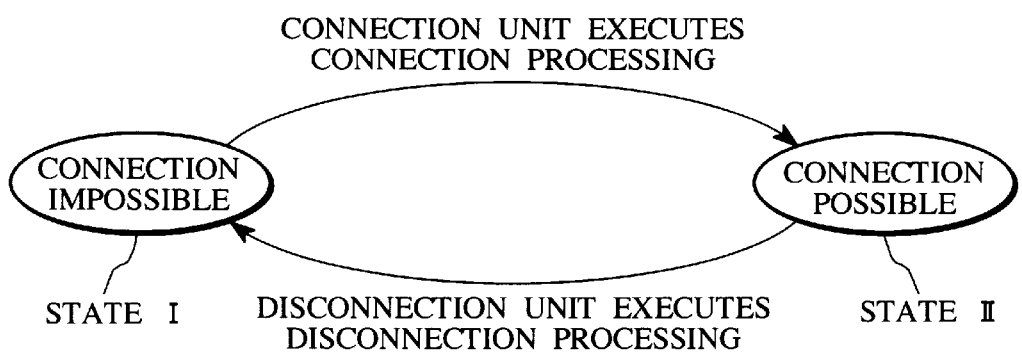
FIG. 4 is a diagram for explaining a second specific example of the procedure for the judgement processing to judge whether the server access according to the specified protocol HTTP is possible or not, that can be used in a course of the operation of FIG. 2.

Referring now to FIG. 1 to FIG. 7, one embodiment of a file transfer method and a file requesting client device according to the present invention will be described in detail.

FIG. 1 shows a configuration of an information communication system in this embodiment and functional configurations of programs used in this system. This information communication system is a client-server system for providing various files (hypertext in HTML format, static images, video images, audio data, etc.) from a server to a client by utilizing the network environment such as that of the Internet, for example. This system of FIG. 1 generally comprises a file server 110 which operates as a WWW server for providing files, and a file requesting client 120 which operates as a WWW client for requesting files.

On the file server 110, a file server program 150 is operating. This file server program 150 functions as the WWW server program, and includes a request handling unit 151 and a request processing unit 152. The request handling unit 151 is a program for handling a request such as a file transfer request according to a file transfer protocol such as HTTP from a file display program 130 operating on the file requesting client 120. The request processing unit 152 is a program for carrying out actual processing according to the requests handled by the request handling unit 151. For example, when the request handling unit 151 handles the file transfer request 140, the corresponding file is searched among files 111 stored in the storage medium 156, and when this file is found, the file transfer 141 is carried out.

On the file requesting client 120, the file display program 130 is operating. This file display program 130 functions as the WWW client program (WWW browser), and includes a connection unit 131, a file request unit 132, a file receiving unit 133, a file storing unit 134, a file display unit 135, a request handling unit 136, a disconnection unit 137, and a multiple files transfer request unit 138.

The connection unit 131 is a program for carrying out a connection to the file server 110 by the protocol such as TCP/IP. The file request unit 132 is a program for issuing the file transfer request to the file server 110 by the file transfer protocol such as HTTP. The file receiving unit 133 is a program for receiving a file provided from the file server 110.

The file storing unit 134 is a program for caching (temporarily storing) a file received from the file server 110 into a local file cache region 121*a* of a storage medium 121. The file cached into the local file cache region 121*a* is automatically allocated with a name and stored without a command from the user, unlike a usual file which is stored using a file name explicitly specified by the user. A stored position and a file name of a file cached into the local file cache region 121*a* are independently managed by the file display program 130.

The file display unit 135 is a program for displaying the requested file on a screen. The request handling unit 136 is a program for handling requests for file transfer or file display from the user or program. The disconnection unit 137 is a program for disconnecting a connection to a network.

The multiple files transfer request unit 138 is a program for commanding the file request unit 132 to issue multiple file transfer requests with respect to one transfer request handled by the request handling unit 136. By means of this, it becomes possible to transfer multiple files including the requested file and its related files from the file server 110 to the file requesting client 120 at once, by a single file transfer request operation by the user. In this case, only the file specified by the file transfer request operation by the user is displayed on a screen, while the other related files are stored into the local file cache region 121*a* together with the file specified by the file transfer request operation.

The related file information necessary in issuing the file requests such as locations and file names of the related files can be acquired from information on links to the related files which is contained in a URL (Uniform Resource Locator) format within the file of the HTML format transferred from the file server 110 to the file requesting client 120. It is also possible to transfer a list specifying the related files from the file server 110 to the file requesting client 120, and acquire the information necessary in issuing multiple file transfer requests in order for the multiple files transfer request unit 138 to obtain the related files according to this file. It is also possible to use a method in which the transfer of the multiple files Is realized by concatenating the multiple related files in advance at the file server 110 side and transferring this concatenated file from the file server 110 in response to the file transfer request from the file requesting client 120. In this last case, the multiple files transfer request unit 138 of FIG. 1 will be unnecessary.

Next, with reference to the flow chart of FIG. 2, the first concrete example of the operation procedure for the file display program 130 will be described.

First, a user or program requests transfer and display of a file by issuing a file transfer request (step S11). For this purpose, it suffices to use the URL mentioned above which is an identifier for uniquely identifying the file. For example, when the URL is specified as "http://isl.rdc.toshiba.co.jp/index.html", it is possible to uniquely identify the file for which the transfer protocol is the HTTP, the server (connection destination file server name) is "isl.rdc.toshiba.co.jp", and the file name is "index.html".

The request handling unit 136 handles this file transfer request in HTTP format which requires a server access (step S12), and the file storing unit 134 searches through the local file cache region 121*a* in the storage medium 121 of the file requesting client 120 to see whether the file specified by the file transfer request is cached in the local file cache region 121*a* (step S13). For this purpose, it is preferable to adopt a policy in which the files cached in the local file cache region 121*a* are managed according to file names uniquely determined from the uniquely specified identifier as described above.

For example, in a case of an exemplary identifier described above, the one-to-one correspondence between the local file name and the URL can be realized by converting the identifier into a file name such as "/http/isl.rdc.toshiba.co.Jp/index.html" and managing the file according to this file name. In this case, whether the file specified by the file transfer request is cached into the local file cache region 121*a* of the file requesting client 120 or not can be checked by checking whether a file with a file name "/http/isl.rdc.toshiba.co.Jp/index.html" exists in the local file cache region 121*a* or not.

When the file specified by the file transfer request in HTTP format is found to be existing in the local file cache region 121*a* (step S14 YES), whether a connection according to the specified protocol HTTP is possible or not, that is, whether it is in a state capable of making an access to the file server 110 according to the specified protocol HTTP or not, is judged by the file request unit 132 (step S15). Examples of a specific procedure for this judgment processing will be described below with references to FIG. 3 to FIG. 5. For example, the server access according to the specified protocol HTTP is possible when all of the following conditions (1) to (4) hold.

(1) The file requesting client 120 is physically connected to the network through a communication device.

(2) The file server 110 is functioning normally.

(3) The network and computer resources of at least one route connecting the file requesting client 120 and the file server 110 are functioning normally.

(4) A connection between the file requesting client 120 and the file server 110 is established by a protocol such as TCP/IP, and an environment for enabling communications according to the specified protocol HTTP has been constructed.

When it is judged as a state in which the server access according to HTTP is possible, the file request unit 132 sends the creation date and time of the requested file as cached in the local file cache region 121*a* to the file server 110, so as to inquire whether it is the latest file or not (step S16). In response to this inquiry request, the file server 110 compares the creation date and time sent by this inquiry request with the creation date and time of the corresponding file managed in the file server 110. If the creation date and time coincide, the file server 110 notifies this fact alone to the file requesting client 120 as a response to the inquiry, whereas if the creation date and time do not coincide, the requested file is transferred as a response to the inquiry.

At the file display program 130, if the response to the inquiry is not received from the file server 110 (step S17 NO), a receiving error message is displayed by the file display unit 135 (step S18). On the other hand, when the response from the file server 110 is received (step S17 YES), whether the response is a transfer of the requested file or a notification of the fact that the creation date and time coincide is interpreted by the file receiving unit 133 (step S19). This interpretation of the response can be realized, for example, by adopting a policy in which the top few bytes of the response are set as a header for indicating a type of response, to which different numbers are to be assigned for different types of response, so that a type of response can be judged by checking a number indicated by this header.

When the response is a notification of the fact that the creation date and time coincide (step S19 NO), the requested file as cached in the local file cache region 121a is the latest one, so that the file display unit 135 reads out this file from the local file cache region 121a and displays it (step S20). When the response is a transfer of the requested file (step S19 YES), the transferred file is displayed by the file display unit 135, while the transferred file is stored into the local file cache region 121a by the file storing unit 134, with a file name attached thereto according to the policy described above (step S21).

On the other hand, when it is judged as a state in which the server access according to the specified protocol HTTP is not possible (step S15 NO), the access to the file server 110 is not carried out, and the file display unit 135 reads out the requested file from the local file cache region 121a and displays it (step S22). At this point, a message indicating that the displayed file may not necessarily be the latest file (the file obtained through the processing of the steps S15, S16, S17, S19 and S20) can be presented to the user if desired. Also, when a user gives an indication that the file which may not necessarily be the latest file is unnecessary, it is also possible to carry out the processing of the steps S16 to S21 at this point.

Next, a case in which the requested file does not exist in the local file cache region 121a of the file requesting client 120 will be described.

Namely, when the file specified by the file transfer request in HTTP format is found to be not existing in the local file cache region 121a (step S14 NO), whether a connection according to the specified protocol HTTP is possible or not, that is, whether it is in a state capable of making an access to the file server 110 according to the specified protocol HTTP or not, is judged by the file request unit 132 (step S23).

When it is judged as a state in which the server access is not possible (step S23 NO), a message indicating that the server connection is not possible is displayed to the user (step S24).

When it is judged as a state in which the server access is possible (step S23 YES), the file request unit 132 sends a file transfer request in HTTP format to the file server 110, so as to request a file transfer (step S25). When a file transferred from the file server 110 is received successfully (step S26 YES), the transferred file is displayed by the file display unit 135, while the transferred file is stored into the local file cache region 121a by the file storing unit 134, with a file name attached thereto according to the policy described above (step S27). If the receiving of the transferred file fails (step S26 NO), a receiving error message is displayed by the file display unit 135 (step S28).

Next, with reference to the flow chart of FIG. 3, the first specific example of the procedure for the judgement processing to judge whether the server access according to the specified protocol HTTP is possible or not will be described.

In this first example, a time-out period for a communication between the client and the server according to HTTP is set up first (step S31). HTTP messages are used for a communication between the client and the server according to HTTP, and the HTTP messages include a request message such as that for a file transfer request to be sent from the client to the server, and a response message such as that for a file to be sent from the server to the client in response to the request message. Consequently, the above described communication time-out period can be defined as a maximum tolerable period since the sending of some request message by the file request unit 132 until the return of the response message from the file server 110.

Then, the file request unit 132 tries the communication according to the specified protocol HTTP by executing a function for transmitting the request message as a communication packet to the file server 110 (step S32). The control is returned from this function either when the communication succeeded or when the transfer is not finished after an elapse of the time-out period. When the control is returned, whether the communication succeeded or the time-out occurred is checked (step S33).

In a case where the message transmission succeeded and the response message is returned within the time-out period, it is judged that it is in a state in which the server access using communication according to the specified protocol HTTP is possible (step S34). In a case where the response message is not received within the time-out period, it is judged that it is in a state in which the server access using communication according to the specified protocol HTTP is not possible (step S35).

By carrying out this judgement processing in which whether the server access is possible or not is judged by actually attempting communication, whether the server access is possible or not can be judged by accounting for the current network environment and the operation state of the file server 110, so that it becomes possible to deal with an unexpected trouble in the network or computer resources existing on the route between the file requesting client 120 and the file server 110.

Next, with reference to the diagram of FIG. 4, the second specific example of the procedure for the judgement processing to judge whether the server access according to the specified protocol HTTP is possible or not will be described.

In this second example, the status of the file requesting client 120 is recorded when the connection with the file server 110 is established as the file requesting client 120 succeeds in the network connection according to the prescribed protocol such as TCP/IP, and when the connection established state is released, and whether it is in a state in which the server access is possible or not is judged at the file request unit 132 by referring to a content of the status when the file transfer request in HTTP format is issued from a user or program.

The status is allowed to take either one of two states including a connection impossible state (state I) in which the server access cannot be made and a connection possible state (state II) in which the server access can be made, and the initial state is set to the state I. In this state, when the connection unit 131 executes the connection processing and the connection with the file server 110 is established successfully, the content of the status is changed from the state I to the state II. Then, when the disconnection unit 137 executes the disconnection processing, the content of the status is changed from the state II to the state I.

When the file transfer request in HTTP format is issued by a user or program while in the state I, it is judged that it is in a state in which the server access using communication according to HTTP is possible, whereas when the file transfer request in HTTP format is issued by a user or program while in the state II, it is judged that it is in a state in which the server access using communication according to HTTP is not possible.

In this manner, by judging whether the server access is possible or not by utilizing the state machine instead of actually attempting the server access according to HTTP, it becomes possible to judge whether the server access is possible or not more quickly.

Figure 5:
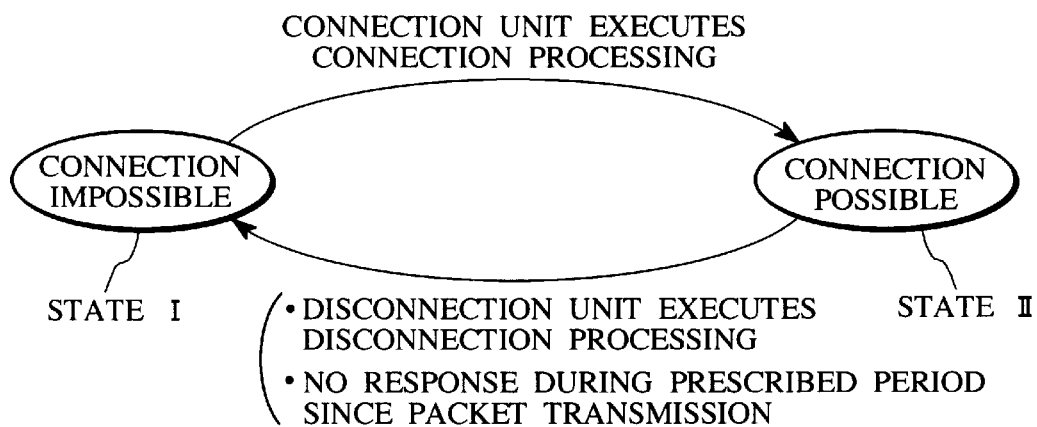
FIG. 5 is a diagram for explaining a third specific example of the procedure for the judgement processing to judge whether the server access according to the specified protocol HTTP is possible or not, that can be used in a course of the operation of FIG. 2.

Next, with reference to the diagram of FIG. 5, the third specific example of the procedure for the judgement processing to judge whether the server access according to the specified protocol HTTP is possible or not will be described.

In this third example, whether the server access is possible or not is judged by utilizing the state machine similarly as in the second example, but an extra condition for transition from the state II to the state I is added in order to make it possible to deal with an unexpected trouble in the network or computer resources existing on the route between the file requesting client 120 and the file server 110.

Namely, in the second example described above, the transition from the state II to the state I is made only when the disconnection unit 137 starts the disconnection processing in response to an explicit request from a user or program, so that there is a possibility for causing useless server access attempts in a case where the connection is disconnected due to an unexpected accident, without the disconnection processing, so that the status remains in the state II. To cope with such a situation, in this third example, whether a response to an individual request issued by the file requesting client 120 in the state II is returned from the file server 110 within a prescribed period or not is constantly monitored, and a process to forcefully change the content of the status to the state I when a response is not returned within the prescribed period is incorporated. Consequently, the status can be changed to the state I when the connection is disconnected due to an unexpected accident, without the disconnection processing by the disconnection unit 137.

As described, according to the file reading method and the file requesting client device of this embodiment, when the file transfer request according to the file transfer protocol HTTP that requires the server access is issued at the file requesting client 120, whether it is in a state in which the access to the file server 110 according to HTTP is possible or not is checked. The server access is carried out when it is in a state in which the server access is possible. However, when it is in a state in which the server access is not possible, the access to the local file cache region 121a is carried out instead of the server access, as a processing in response to the file transfer request according to HTTP. Then, the file specified by the file transfer request among files cached in the local file cache region 121a is read out and displayed.

Consequently, as long as the requested file is cached in the file requesting client 120, that cached file can be read out and utilized, even when it is in a state in which the server access cannot be made in response to the file transfer request that requires the server access according to HTTP, as in a case where a computer used as the file requesting client 120 is physically not connected to the network, or a case where the connection between the client and the server is not established, for example.

For this reason, particularly in a case where the file requesting client 120 is a device such as a portable terminal which is not necessarily used under an environment in which a connection to a network is always possible, when the file reading method of this embodiment is used in conjunction with a function for collectively transferring multiple files, the hit ratio for the cached files can be increased so that it becomes possible to realize the effective utilization of the cache function.

Figure 6:
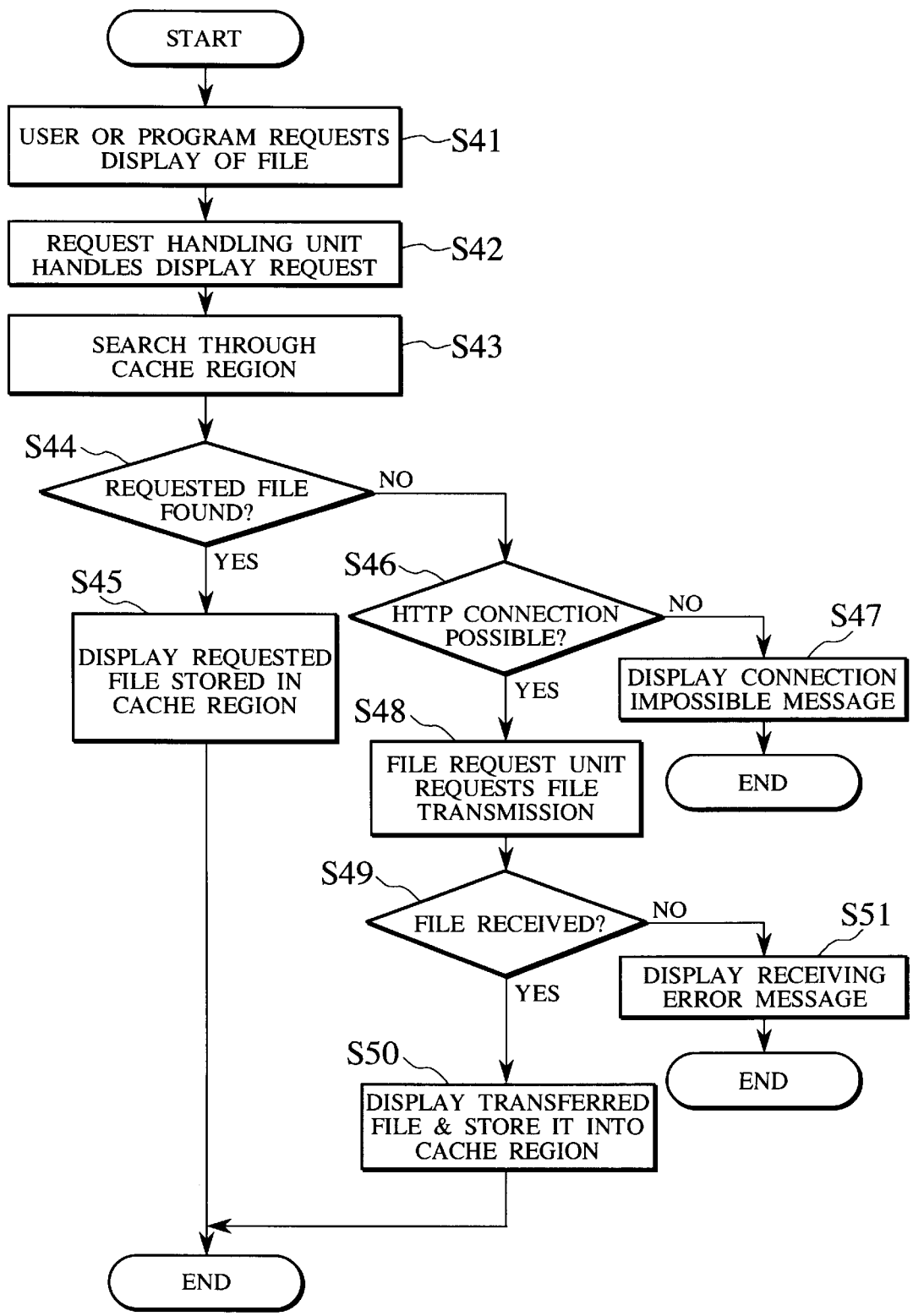
FIG. 6 is a flow chart of a second concrete example of the operation procedure for the file display program in the information communication system of FIG. 1.

Next, with reference to the flow chart of FIG. 6, the second concrete example of the operation procedure for the file display program 130 will be described.

First, a user or program requests transfer and display of a file by issuing a file transfer request (step S41). For this purpose, it suffices to use the URL mentioned above which is an identifier for uniquely identifying the file. For example, when the URL is specified as "http://isl.rdc.toshiba.co.jp/index.html", it is possible to uniquely identify the file for which the transfer protocol is the HTTP, the server (connection destination file server name) is "isl.rdc.toshiba.co.jp", and the file name is "index.html".

The request handling unit 136 handles this file transfer request in HTTP format which requires a server access (step S42), and the file storing unit 134 searches through the local file cache region 121a in the storage medium 121 of the file requesting client 120 to see whether the file specified by the file transfer request is cached in the local file cache region 121a (step S43). For this purpose, it is preferable to adopt a policy in which the files cached in the local file cache region 121a are managed according to file names uniquely determined from the uniquely specified identifier as described above.

When the file specified by the file transfer request in HTTP format is found to be existing in the local file cache region 121a (step S44 YES), the file display unit 135 reads out the requested file from the local file cache region 121a and displays it (step S45). At this point, a message indicating that the displayed file may not necessarily be the latest file can be presented to the user if desired.

On the other hand, when the file specified by the file transfer request in HTTP format is found to be not existing in the local file cache region 121a (step S44 NO), whether a connection according to the specified protocol HTTP is possible or not, that is, whether it is in a state capable of making an access to the file server 110 according to the specified protocol HTTP or not, is judged by the file request unit 132 (step S46), using any one of the three procedures for the judgement processing as described above.

When it is judged as a state in which the server access is not possible (step S46 NO), a message indicating that the server connection is not possible is displayed to the user (step S47).

When it is judged as a state in which the server access is possible (step S46 YES), the file request unit 132 sends a file transfer request in HTTP format to the file server 110, so as to request a file transfer (step S48). When a file transferred from the file server 110 is received successfully (step S49 YES), the transferred file is displayed by the file display unit 135, while the transferred file is stored into the local file cache region 121a by the file storing unit 134, with a file name attached thereto according to the policy described above (step S50). If the receiving of the transferred file fails (step S49 NO), a receiving error message is displayed by the file display unit 135 (step S51).

As described, in this second procedure, when the file specified by the file transfer request in HTTP format exists in the local file cache region 121a, the server access for the sake of inquiring whether the cached file is the latest file or not is not carried out, and the reading of the requested file from the local file cache region 121a is carried out unconditionally. Even in this second procedure, it is possible to resolve the conventionally encountered inconvenience of not being able to utilize the cached file unless the server access is carried out normally, so that it is possible to realize the effective utilization of the cache contents.

Next, with reference to the block diagram of FIG. 7, an alternative functional configuration of the program executed on the file requesting client 120 will be described.

Namely, the exemplary configuration shown in FIG. 1 is directed to a case in which the file requesting client 120 executes the file display program 130 which functions as the WWW client program (WWW browser), and includes a connection unit 131, a file request unit 132, a file receiving unit 133, a file storing unit 134, a file display unit 135, a request handling unit 136, a disconnection unit 137, and a multiple files transfer request unit 138, so that this file display program 130 carries out the entire processing on the file requesting client 120 including the handling of the request from the user, the displaying of the requested file, and the communication with the file server 110. In contrast, the alternative configuration shown in FIG. 7 is directed to a case in which the WWW client program is divided into a file display program 260 for realizing a user interface and a file management program 230 for realizing the communication with the file server 110.

In this case, the file management program 230 comprises a connection unit 231, a file request unit 232, a file receiving unit 233, a file storing unit 234, a request handling unit 235, a request processing unit 236, a disconnection unit 237, and a multiple files transfer request unit 238. In this file management program 230, the search and the memory management of the local file cache region 121a and the communication with the file server 110 are carried out in response to requests from the file display program 260. Here, the connection unit 231, the file request unit 232, the file receiving unit 233, the file storing unit 234, the request handling unit 235, the disconnection unit 237, and the multiple files transfer request unit 238 respectively correspond to the connection unit 131, the file request unit 132, the file receiving unit 133, the file storing unit 134, the request handling unit 136, the disconnection unit 137, and the multiple files transfer request unit 138 of FIG. 1. Also, the request processing unit 236 carries out the processing corresponding to a request from the file display program 260 which is handled by the request handing unit 235.

On the other hand, the file display program 260 comprises a file request unit 261, a file receiving unit 262, and a file display unit 263. In this file display program 230, the handling of requests from the user and the conveying of requests to the file management program 230 are carried out.

Figure 7:
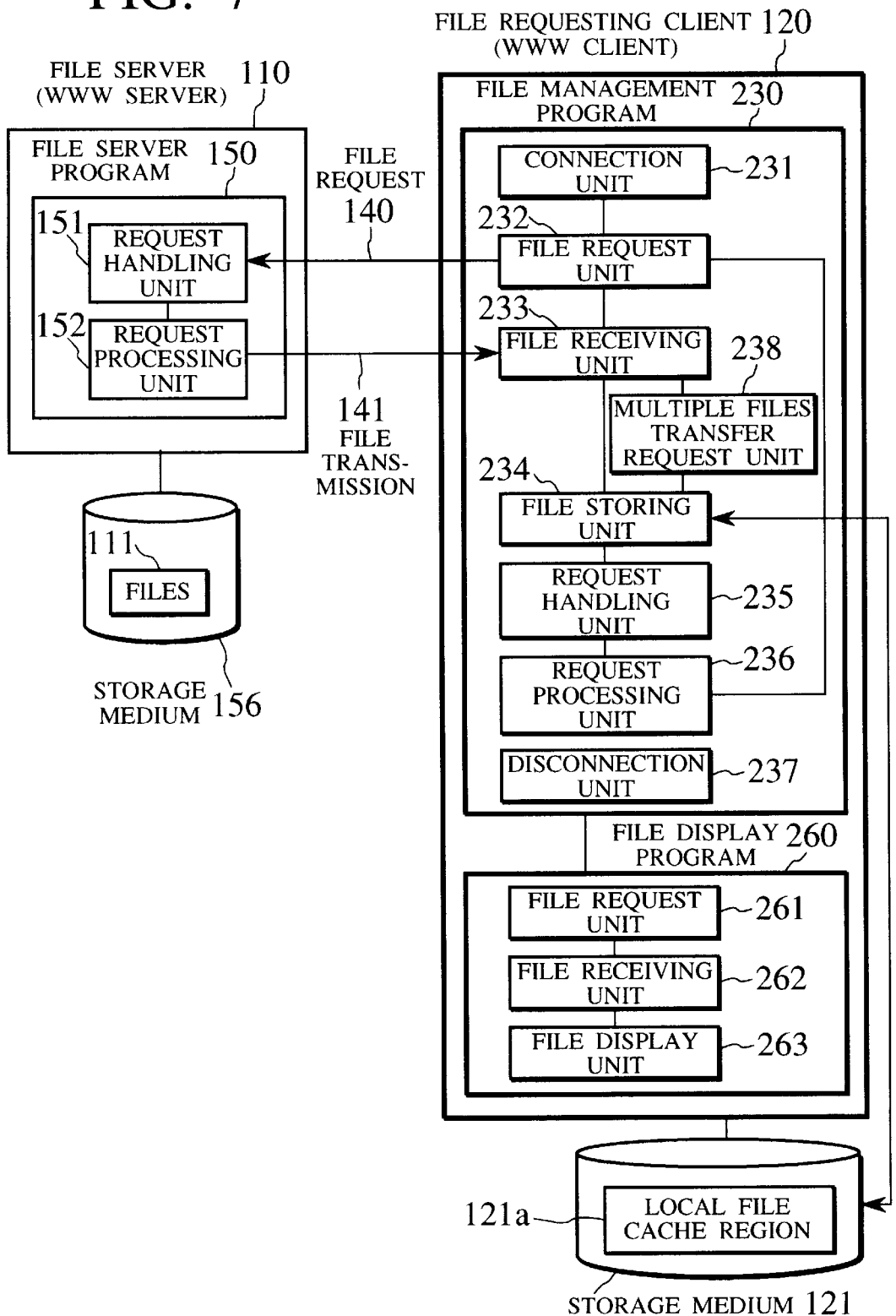
FIG. 7 is a block diagram of an alternative configuration of an information communication system according to one embodiment of the present invention.

In this alternative configuration of FIG. 7, when the file transfer request from the user is sent to the file management program 230 via the file display program 260, the judgement as to whether the server access is possible or not, and the processing to select the file reading source (the file server 110 or the local file cache region 121a) according to the judgement result are carried out at the file management program 230.

In this manner, the file reading method of this embodiment is valid regardless of whether the WWW client program to be operated on the file requesting client 120 is implemented as a single program or plural programs.

Note that the file reading method of this embodiment is basically realized by the WWW client program operating on the file requesting client 120, so that the file server program 150 operating on the file server 110 can be a usual WWW server program.

As explained, according to the present invention, it becomes possible to realize the effective utilization of the files cached into a local file storage region of the client even under an environment in which the server access is not possible, so that the file utilization in the client-server system using a client with a cache function can be made more efficient.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the file display program 130 of FIG. 1 or each one of the file management program 230 and the file display program 260 of FIG. 7 can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A file reading method in a client-server system including a server for realizing a file providing service and a client for issuing file transfer requests and caching files transferred from the server in response to the file transfer requests into a local file storage region, the method comprising the steps of:

judging whether the client is in a state in which an access to the server according to a specified protocol is possible or not, when each file transfer request is issued at the client;

making an access to the server according to the specified protocol when the judging step judges that the client is in a state in which an access to the server according to the specified protocol is possible; and reading a requested file specified by said each file transfer request from files cached in the local file storage region when the judging step judges that the client is in a state in which an access to the server according to the specified protocol is not possible.

2. The method of claim 1, wherein when the judging judges that the client is in a state in which an access to the server according to the specified protocol is possible, the server transfers multiple files including the requested file to the client in response to the access according to the specified protocol made by the making step.

3. The method of claim 1, wherein the judging step includes the sub-steps of:

checking whether a response to each request issued from the client to the server is returned from the server within a prescribed period or not; and judging that the client is in a state in which an access to the server according to the specified protocol is possible when the response is returned within the prescribed period, or that the client is in a state in which an access to the server according to the specified protocol is not possible when the response is not returned within the prescribed period.

4. The method of claim 1, wherein the judging step includes the sub-steps of:

recording a status of the client indicating a current connection state which is sequentially changed between a connected state and a disconnected state whenever a connection between the client and the server is established or disconnected;

checking the status of the client in response to the file transfer request issued at the client; and judging that the client is in a state in which an access to the server according to the specified protocol is possible when the status indicates the connected state, or that the client is in a state in which an access to the server according to the specified protocol is not possible when the status indicates the disconnected state.

5. The method of claim 4, further comprising the step of:

checking whether a response to each request issued from the client to the server is returned from the server within a prescribed period or not; and changing the current connection state indicated by the status of the client to the disconnected state when the response is not returned within the prescribed period.

6. A file reading method in a client-server system including a server for realizing a file providing service and a client for issuing file transfer requests and caching files transferred from the server in response to the file transfer requests into a local file storage region, the method comprising the steps of:

judging whether the client is in a state in which an access to the server according to a specified protocol is possible or not, when each file transfer request is issued at the client;

checking whether a requested file specified by said each file transfer request among files cached in the local file storage region is a latest file or not, when the judging step judges that the client is in a state in which an access to the server according to the specified protocol is possible;

making an access to the server according to the specified protocol and transferring the requested file from the server to the client, when the checking step finds that the requested file as cached in the local file storage region is not the latest file; and reading the requested file from files cached in the local file storage region when the judging step judges that the client is in a state in which an access to the server according to the specified protocol is not possible, or when the checking step finds that the requested file as cached in the local file storage region is the latest file.

7. The method of claim 6, wherein the checking step checks whether the requested file as cached in the local file storage region is the latest file or not by comparing a creation time of the requested file as cached in the local file storage region with a creation time of the requested file as managed at the server side.

8. The method of claim 6, wherein the server transfers multiple files including the requested file to the client in response to the access according to the specified protocol at the making step.

9. The method of claim 6, wherein the judging step includes the sub-steps of:

checking whether a response to each request issued from the client to the server is returned from the server within a prescribed period or not; and judging that the client is in a state in which an access to the server according to the specified protocol is possible when the response is returned within the prescribed period, or that the client is in a state in which an access to the server according to the specified protocol is not possible when the response is not returned within the prescribed period.

10. The method of claim 6, wherein the judging step includes the sub-steps of:

recording a status of the client indicating a current connection state which is sequentially changed between a connected state and a disconnected state whenever a connection between the client and the server is established or disconnected;

checking the status of the client in response to the file transfer request issued at the client; and judging that the client is in a state in which an access to the server according to the specified protocol is possible when the status indicates the connected state, or that the client is in a state in which an access to the server according to the specified protocol is not possible when the status indicates the disconnected state.

11. The method of claim 10, further comprising the step of:

checking whether a response to each request issued from the client to the server is returned from the server within a prescribed period or not; and changing the current connection state indicated by the status of the client to the disconnected state when the response is not returned within the prescribed period.

12. A file reading method in a client-server system including a server for realizing a file providing service and a client for issuing file transfer requests and caching files transferred from the server in response to the file transfer requests into a local file storage region, the method comprising the steps of:

checking whether a requested file specified by each file transfer request exists among files cached in the local file storage region, when said each file transfer request is issued at the client;

reading the requested file from files cached in the local file storage region when the checking step finds that the requested file exists among files cached in the local file storage region;

judging whether the client is in a state in which an access to the server according to a specified protocol is possible or not, when the checking step finds that the requested file does not exist among files cached in the local file storage region; and making an access to the server according to the specified protocol and transferring the requested file from the server to the client, when the judging step judges that the client is in a state in which an access to the server according to the specified protocol is possible.

13. The method of claim 12, wherein the server transfers multiple files including the requested file to the client in response to the access according to the specified protocol at the making step.

14. The method of claim 12, wherein the judging step includes the sub-steps of:

checking whether a response to each request issued from the client to the server is returned from the server within a prescribed period or not; and judging that the client is in a state in which an access to the server according to the specified protocol is possible when the response is returned within the prescribed period, or that the client is in a state in which an access to the server according to the specified protocol is not possible when the response is not returned within the prescribed period.

15. The method of claim 12, wherein the judging step includes the sub-steps of:

recording a status of the client indicating a current connection state which is sequentially changed between a connected state and a disconnected state whenever a connection between the client and the server is established or disconnected;

checking the status of the client in response to the file transfer request issued at the client; and judging that the client is in a state in which an access to the server according to the specified protocol is possible when the status indicates the connected state, or that the client is in a state in which an access to the server according to the specified protocol is not possible when the status indicates the disconnected state.

16. The method of claim 15, further comprising the step of:

checking whether a response to each request issued from the client to the server is returned from the server within a prescribed period or not; and changing the current connection state indicated by the status of the client to the disconnected state when the response is not returned within the prescribed period.

17. A file requesting client device functioning as a client associated with a local file storage region in a client-server system including a server for realizing a file providing service, the device comprising:

first means for issuing file transfer requests;

second means for caching files transferred from the server in response to the file transfer requests issued by the first means into the local file storage region;

third means for judging whether the client is in a state in which an access to the server according to a specified protocol is possible or not, when each file transfer request is issued by the first means;

fourth means for making an access to the server according to the specified protocol when the third means judges that the client is in a state in which an access to the server according to the specified protocol is possible; and fifth means for reading a requested file specified by said each file transfer request from files cached in the local file storage region when the third means judges that the client is in a state in which an access to the server according to the specified protocol is not possible.

18. A file requesting client device functioning as a client associated with a local file storage region in a client-server system including a server for realizing a file providing service, the device comprising:

first means for issuing file transfer requests;

second means for caching files transferred from the server in response to the file transfer requests issued by the first means into the local file storage region;

third means for judging whether the client is in a state in which an access to the server according to a specified protocol is possible or not, when each file transfer request is issued by the first means;

fourth means for checking whether a requested file specified by said each file transfer request among files cached in the local file storage region is a latest file or not, when the third means judges that the client is in a state in which an access to the server according to the specified protocol is possible;

fifth means for making an access to the server according to the specified protocol so that the server transfers the requested file to the client, when the fourth means finds that the requested file as cached in the local file storage region is not the latest file; and sixth means for reading the requested file from files cached in the local file storage region when the third means judges that the client is in a state in which an access to the server according to the specified protocol is not possible, or when the fourth means finds that the requested file as cached in the local file storage region is the latest file.

19. A file requesting client device functioning as a client associated with a local file storage region in a client-server system including a server for realizing a file providing service, the device comprising:

first means for issuing file transfer requests;

second means for caching files transferred from the server in response to the file transfer requests issued by the first means into the local file storage region;

third means for checking whether a requested file specified by each file transfer request exists among files cached in the local file storage region, when said each file transfer request is issued by the first means;

fourth means for reading the requested file from files cached in the local file storage region when the third means finds that the requested file exists among files cached in the local file storage region;

fifth means for judging whether the client is in a state in which an access to the server according to a specified protocol is possible or not, when the third means finds that the requested file does not exist among files cached in the local file storage region; and sixth means for making an access to the server according to the specified protocol so that the server transfers the requested file to the client, when the fifth means judges that the client is in a state in which an access to the server according to the specified protocol is possible.

20. An article of manufacture, comprising:

a computer usable medium having computer readable program code means embodied therein for causing a computer to function as a client associated with a local file storage region in a client-server system including a server for realizing a file providing service, the computer readable program code means including:

first computer readable program code means for causing said computer to issue file transfer requests;

second computer readable program code means for causing said computer to cache files transferred from the server in response to the file transfer requests issued by the first computer readable program code means into the local file storage region;

third computer readable program code means for causing said computer to judge whether the client is in a state in which an access to the server according to a specified protocol is possible or not, when each file transfer request is issued by the first computer readable program code means;

fourth computer readable program code means for causing said computer to make an access to the server according to the specified protocol when the third computer readable program code means judges that the client is in a state in which an access to the server according to the specified protocol is possible; and fifth computer readable program code means for causing said computer to read a requested file specified by said each file transfer request from files cached in the local file storage region when the third computer readable program code means judges that the client is in a state in which an access to the server according to the specified protocol is not possible.

21. An article of manufacture, comprising:

a computer usable medium having computer readable program code means embodied therein for causing a computer to function as a client associated with a local file storage region in a client-server system including a server for realizing a file providing service, the computer readable program code means including:

first computer readable program code means for causing said computer to issue file transfer requests;

second computer readable program code means for causing said computer to cache files transferred from the server in response to the file transfer requests issued by the first computer readable program code means into the local file storage region;

third computer readable program code means for causing said computer to judge whether the client is in a state in which an access to the server according to a specified protocol is possible or not, when each file transfer request is issued by the first computer readable program code means;

fourth computer readable program code means for causing said computer to check whether a requested file specified by said each file transfer request among files cached in the local file storage region is a latest file or not, when the third computer readable program code means judges that the client is in a state in which an access to the server according to the specified protocol is possible;

fifth computer readable program code means for causing said computer to make an access to the server according to the specified protocol so that the server transfers the requested file to the client, when the fourth computer readable program code means finds that the requested file as cached in the local file storage region is not the latest file; and sixth computer readable program code means for causing said computer to read the requested file from files cached in the local file storage region when the third computer readable program code means judges that the client is in a state in which an access to the server according to the specified protocol is not possible, or when the fourth computer readable program code means finds that the requested file as cached in the local file storage region is the latest file.

22. An article of manufacture, comprising:

a computer usable medium having computer readable program code means embodied therein for causing a computer to function as a client associated with a local file storage region in a client-server system including a server for realizing a file providing service, the computer readable program code means including:

first computer readable program code means for causing said computer to issue file transfer requests;

second computer readable program code means for causing said computer to cache files transferred from the server in response to the file transfer requests issued by the first computer readable program code means into the local file storage region;

third computer readable program code means for causing said computer to check whether a requested file specified by each file transfer request exists among files cached in the local file storage region, when said each file transfer request is issued by the first computer readable program code means;

fourth computer readable program code means for causing said computer to read the requested file from files cached in the local file storage region when the third computer readable program code means finds that the requested file exists among files cached in the local file storage region;

fifth computer readable program code means for causing said computer to judge whether the client is in a state in which an access to the server according to a specified protocol is possible or not, when the third computer readable program code means finds that the requested file does not exist among files cached in the local file storage region; and sixth computer readable program code means for causing said computer to make an access to the server according to the specified protocol so that the server transfers the requested file to the client, when the fifth computer readable program code means judges that the client is in a state in which an access to the server according to the specified protocol is possible.

* * * * *

UNITED STATES PATENT AND TRADEMARK OFFICE
CERTIFICATE OF CORRECTION

PATENT NO. : 5,987,476

DATED : November 16, 1999

INVENTOR(S): Toru IMAI, et al

It is certified that an error appears in the above-identified patent and that said Letters Patent is hereby corrected as shown below:

On the title page, item [75], the inventors should be:

--[75] Inventors: Toru Imai; Toshihiko Shimokawa; Hideki Yoshida, all of Kanagawa: Hiroko Fujii, Tokyo, all of Japan --

Signed and Sealed this

Fifteenth Day of August, 2000

Attest:

Q. TODD DICKINSON

Attesting Officer     Director of Patents and Trademarks